UNITED STATES PATENT OFFICE.

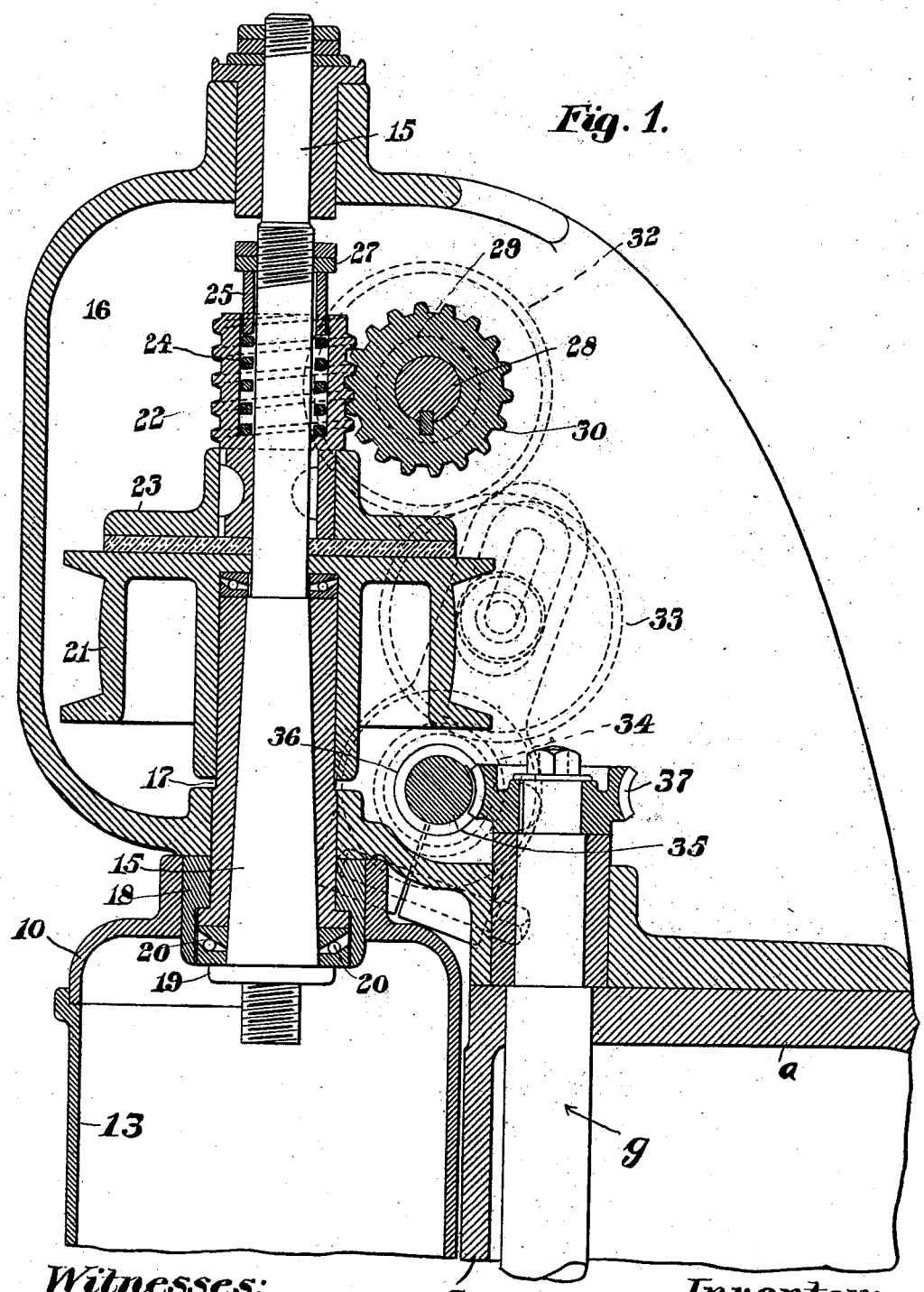

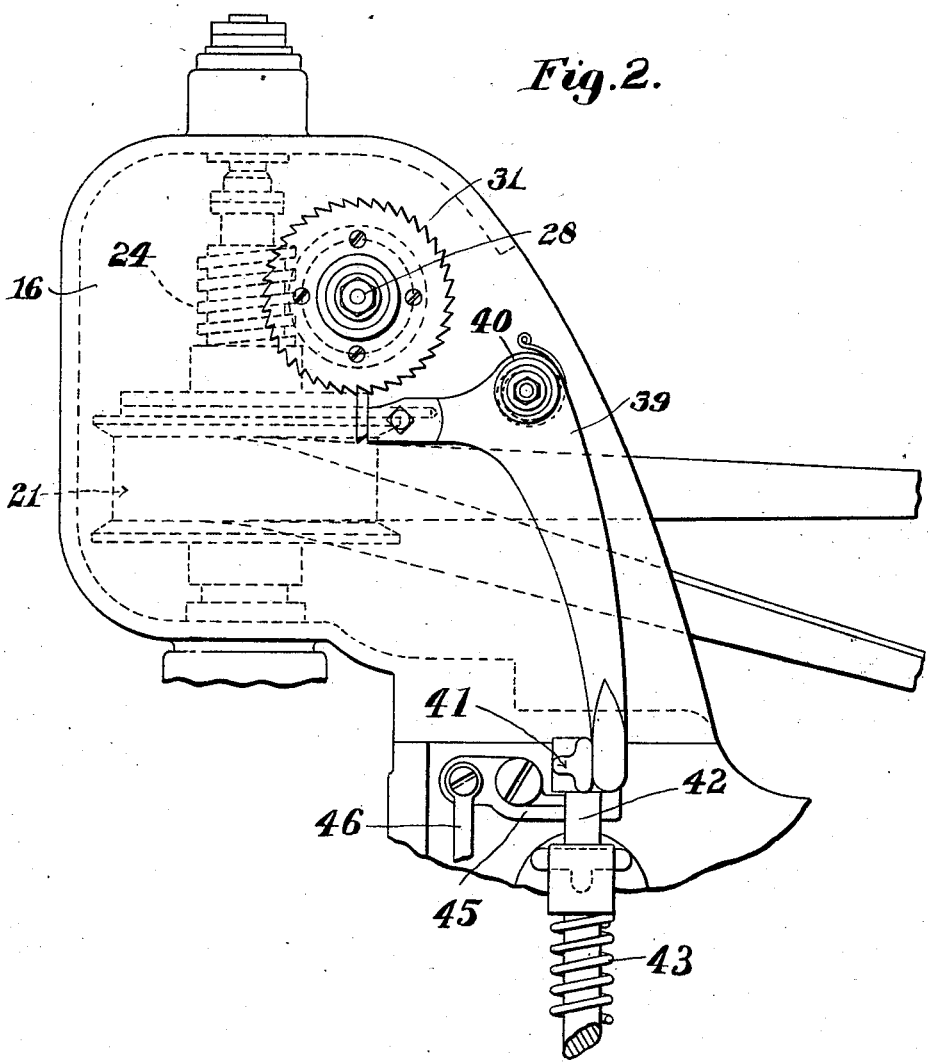

ELBERT M. COUCH, OF HARTFORD, CONNECTICUT, ASSIGNOR TO THE WHITNEY MANUFACTURING COMPANY, OF HARTFORD, CONNECTICUT, A CORPORATION.

CLUTCH MECHANISM.

SPECIFICATION forming part of Letters Patent No. 715,640, dated December 9, 1902.

Application filed September 10, 1902. Serial No. 122,833. (No model.)

*To all whom it may concern:*

Be it known that I, ELBERT M. COUCH, a citizen of the United States, residing at Hartford, in the county of Hartford and State of Connecticut, have invented new and useful Improvements in Clutch Mechanisms, of which the following is a specification.

This invention relates to the construction of stop mechanisms for the feed devices of machine-tools; and it relates more particularly to a device of this character for arresting the operative movements of the feed-spindle of a drilling-machine and analogous constructions; and the object of the invention is to produce a mechanism of the class described which shall operate to arrest the operative rotation of a feed-spindle abruptly at any desired point whereby the feed movement of the work toward the tool, or vice versa, may be accurately gaged and, as in the case of its application to a drilling-machine, for example, whereby a hole may be drilled to an exact depth.

So far as I am aware in stop mechanisms as now constructed there is an appreciable interval between the movement of a shipper-lever to throw a belt onto a loose pulley or to unclutch a clutching mechanism and the actual cessation of the rotary movements of a feed-spindle, during which interval said spindle may make one revolution, more or less. At any rate these stop mechanisms do not so instantly arrest the feed movement of the spindle as to permit the attainment of an absolutely uniform product.

The invention consists in the mechanism constructed and operating substantially as described in the following specification and pointed out clearly in the claims forming a part thereof.

In the drawings, Figure 1 is a vertical sectional view of the upper portion of a drilling-machine to which this invention has been applied. Fig. 2 is a side elevation of the same on a somewhat smaller scale.

In the drawings accompanying this application the invention is shown applied to the spindle of a vertical drill, though obviously it is applicable to any spindle which it may be desired to rotate and stop abruptly. The word "abruptly" is used advisedly in this case, it being understood thereby that the spindle is brought from a state of motion to a state of rest instantly. It is immaterial in drilling-machines and the like whether the spindle rotates the work or the drill. In this application the spindle is shown disassociated from either.

Referring now to the drawings, the standard or frame part of the machine is indicated by *a*, and on this standard is supported a spindle 15, shown inclosed in this machine in a hollow head 16. The upper end of the spindle is threaded, as shown in Fig. 1, and is provided with a suitable nut whereby it may be properly supported in its bearings and whereby vertical adjustments thereof may be effected. At the lower end of the spindle there is mounted thereon a sleeve 17, the lower end of which is flanged and bears against a shoulder formed on the inner surface of a ring 18, which bears against the under side of the head 16. Between a shoulder on the spindle formed by the flange 19 and the lower end of the sleeve 17 is arranged a row of balls 20, which provides for the easy rotation of the spindle against the upthrust brought there against the operation of the machine, which thrust is directly against the head 16. The sleeve 17 is fixed in its position in the head 16 in any suitable way, and on the upper end thereof there is mounted a driving-pulley 21, which turns freely on said sleeve, there being preferably a ball-bearing for the pulley between it and the inner end of the sleeve 17, as shown in Fig. 1 of the drawings.

On the spindle 15, above the pulley 21, is the worm 22, which is rotatable with but slidable on the spindle, the lower end of said worm being provided with a relatively long hub, on which is mounted the friction-disk 23, which is rigidly secured on said hub by a key or otherwise. The face of this disk lies in close proximity to the upper side of the pulley 21 and preferably is provided with a facing of leather.

The worm 22 is counterbored from the upper end thereof toward the other to provide an annular chamber for the reception of a spiral spring 24, and above the worm there is located a sleeve 25, against the lower end of which the spring 24 bears, a nut 27, screwed onto the spindle, serving as an abutment for the upper end of said sleeve and also as a means of adjustment for moving the sleeve relative to the spring to increase or diminish the tension of the latter.

Mounted in the head 16, transversely to the axis of the spindle, is a shaft 28, which is seen in section in Fig. 2. This shaft is mounted in bearings 29, extending from the side of the head 16, to which they are bolted, inward nearly to the center of the shaft, and on the latter between the ends of said bearings there is keyed a worm-gear 30, in mesh with the worm 22. On one end of said shaft 28 there is nonrotatably secured a ratchet 31. On the opposite end of the shaft is fixed a gear 32, which meshes with an intermediate gear 33, (shown only in Fig. 1,) which in turn meshes with a gear 34 on the end of a shaft 35 lying parallel with the shaft 28, and on said shaft 35 is a worm 36, in mesh with a worm-gear 37, keyed to the upper end of the feed-screw $g$. All this is clearly shown in Fig. 1, and it is only in this figure that the gears whereby movement is transmitted from the shaft 28 to the feed-screw are shown. As usual, where transmission-gears are employed in this manner the intermediate gear 33 is preferably mounted in a slotted arm, whereby some other gear of different diameter may be substituted to increase or diminish the speed of rotation of the feed-screw.

The driving-pulley 21, on the spindle 15, is rotated by a belt running from a suitable pulley on a counter-shaft, and the pulley 21, as stated, runs idly on the sleeve 17 until the friction-disk 23 is forced down against its upper side by the spring 24, as above described.

The shaft 28, on which is the worm-gear 30, is, as stated, provided with a ratchet-wheel 31 on one end thereof, and supported on the frame of the machine is an elbow-lever 39, one arm of which is adapted to swing into engagement with the teeth of said ratchet-wheel and arrest abruptly the rotation of the shaft 28. Fig. 2 shows the driving-pulley 21 in operative engagement with the friction-disk 23, and assuming that the parts are rotating in this position the worm 22 will rotate the shaft 28 and through its gear connections referred to impart rotary movement to the feed-screw $g$, which effects the feed of the drill, as heretofore described.

The sudden engagement of the lever 39 with the ratchet-wheel 31 immediately converts the worm-gear 30 from a driving member for the feed-screw $g$ into what is, in effect, a stationary nut, and therefore the continued rotation of the pulley 21 immediately effects the separation of the disk 23 therefrom, for the worm 22, acting on the worm-gear 30 as on a nut, lifts the disk 23 out of driving engagement with the pulley 21. This upward movement of the worm effects the compression of the spring 24, so that as soon as the lever 39 is swung out of engagement with the ratchet-wheel 31 the spring instantly forces the disk 23 again into driving engagement with the pulley 21, the power of the spring being sufficient to rotate the work carried by the spindle against the drill.

The devices whereby the lever 39 is swung automatically into and out of engagement with the ratchet-wheel 31 will now be described, together with certain other parts of the machine coacting with the lever-operating means. On the hub of the lever 39, as shown only in Fig. 2, there is a spring 40, which operates to swing said lever 39 in the direction which will effect the engagement of the short arm thereof with the ratchet-wheel 31, this arm being held out of engagement with the ratchet-wheel by means of an arm 41, mounted transversely upon the upper end of a shaft 42, which shaft is rotatably supported in suitable bearings on the side of the frame $a$. This shaft is provided with a spring 43, coiled around it to effect a partial rotation thereof when it is permitted to do so, and the tension of this spring holds the end of the arm 41 against the depending arm of the lever 39, whereby the short arm of the latter may be held out of engagement with the ratchet 31. A trip-arm 45 engages the end of the arm 41 opposite to that which bears on the depending arm of the elbow-lever and normally holds said arm 41 against the end of the elbow-lever, as shown in Fig. 2. If, however, the rod 46, connected to one end of the arm 45, be operated to disengage the other end from the arm 41, then the spring 43 will swing the arm 41 away from the long arm of the elbow-lever and permit the spring 40 to swing the short arm of the elbow-lever up into engagement with the teeth of the ratchet-wheel 31 and instantly arrest the shaft 28. The rod 46 may be operated automatically in any well-known manner to effect the arrest of the shaft 28. It is obvious that as soon as the shaft 28 comes to a stop all feed movement of the work toward a drill or other tool, or vice versa, must instantly cease.

From the foregoing description of this construction it is seen that the worm-gear 30 plays the double role of a gear for transmitting movement to the train of gears 32, 33, and 34 and through these to the feed-spindle $g$; but also upon the arrest of the shaft 28, on which this worm-gear 30 is secured, its teeth become a rack or represent a nut with which the threads of the worm 22 engage, whereby by the continued rotation of this worm the clutch member 23, secured to the worm, is lifted and separated from the pulley 21, which constitutes the driving clutch member.

It must be remembered that the cessation of feed movement does not depend upon the separation of the clutch members, but that this separation is consequent upon the arrest of the shaft 28. As the worm 22 moves upward the spring 24 is compressed, and upon the separation of the clutch members the worm will remain in its elevated position, and to start the rotation of the feed screw and spindle it is only necessary to rotate the shaft 42 to again swing the lever 41 against the depending arm of the elbow-lever, and thus by the depression of the short arm of the elbow-lever effect the disengagement of the latter from the teeth of the ratchet 31, whereupon the spring 24 will again force the clutch member 23 against the driving member or pulley 21 and impart movement to both the spindle 15 and the feed screw or shaft $g$.

Having thus described my invention, what I claim as new is—

1. A clutch mechanism and operating means thereof consisting of a driving member a driven member adapted to be moved into contact with the driving member, a screw-thread on the driven member, and a pinion with which said screw-thread engages whereby said pinion may be rotated, together with means for abruptly arresting the pinion, whereby the latter may constitute a rack for the threaded portion of said driven clutch member.

2. A clutch mechanism and operating means thereof consisting of a driving member, a driven member adapted to be moved into contact with said driving member, a spring for holding said clutch members in contact, a screw-threaded portion on one of said members, a pinion with which said threaded portion engages and whereby said pinion may be rotated, together with means for arresting abruptly the rotation of said pinion, whereby the continued rotation of the driven member of the clutch will effect the separation of the clutch members.

3. A clutch mechanism and operating means therefor comprising a driving member and a driven member, adapted to be moved and held in operative contact, one with the other; a spring for effecting the engagement of said members, and a screw-threaded portion on one of said members to impart rotary movements to another device, and means cooperating with said screw-threads whereby the latter may, at will, also effect the separation of the clutch members.

ELBERT M. COUCH.

Witnesses:
CLIFFORD A. PEASE,
JOHN NOONE.